(12) United States Patent
Swank

(10) Patent No.: US 10,001,159 B2
(45) Date of Patent: Jun. 19, 2018

(54) PARK BRAKE SYSTEM ADJUSTMENT TOOL

(71) Applicant: Goodrich Corporation, Charlotte, NC (US)

(72) Inventor: John Swank, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 2 days.

(21) Appl. No.: 15/217,502

(22) Filed: Jul. 22, 2016

(65) Prior Publication Data

US 2018/0023616 A1    Jan. 25, 2018

(51) Int. Cl.
| | |
|---|---|
| *B60T 8/18* | (2006.01) |
| *F16C 1/22* | (2006.01) |
| *G01B 3/32* | (2006.01) |
| *B60T 7/10* | (2006.01) |
| *B60T 17/22* | (2006.01) |

(52) U.S. Cl.
CPC .............. *F16C 1/223* (2013.01); *B60T 7/108* (2013.01); *B60T 17/221* (2013.01); *G01B 3/32* (2013.01)

(58) Field of Classification Search
CPC ................................ B60T 8/1806; B60T 8/08
USPC .............. 188/2 D, 195; 74/519; 81/484, 488
See application file for complete search history.

(56) References Cited

U.S. PATENT DOCUMENTS

| | | | | |
|---|---|---|---|---|
| 4,332,423 A | * | 6/1982 | Schopper .............. | B60T 8/1806 188/195 |
| 4,365,846 A | * | 12/1982 | Schopper .............. | B60T 8/1806 251/235 |
| 4,427,239 A | * | 1/1984 | Reinartz ............... | B60T 8/1806 188/195 |
| 4,639,048 A | * | 1/1987 | Schopper .............. | B60T 8/1806 188/195 |
| 4,757,300 A | * | 7/1988 | Sebalos .................. | B60Q 1/441 116/204 |
| 8,117,941 B2 | * | 2/2012 | Murase ................... | B60T 7/102 74/519 |
| 8,714,315 B2 | | 5/2014 | Tessitore | |

(Continued)

FOREIGN PATENT DOCUMENTS

| | | |
|---|---|---|
| EP | 1380487 | 1/2004 |
| EP | 1731790 | 12/2006 |

(Continued)

OTHER PUBLICATIONS

Extended European Search Report dated Jan. 2, 2018 in European Application No. 17174535.9.

*Primary Examiner* — Christopher P Schwartz
(74) *Attorney, Agent, or Firm* — Snell & Wilmer L.L.P.

(57) ABSTRACT

Systems and methods for brake cable adjustment are disclosed herein. In this regard, a gage block tool for adjusting a brake cable may comprise a body comprising, a first member extending in a first direction, the first member having a first length and a first thickness, and a second member extending in a second direction, the second member having a second length and a second thickness. At least one of the first member or the second member may be sized and configured to be placed between a stop and a lever of a brake valve, the brake cable connected between the lever and a brake handle being properly adjusted when the gage block sandwiched between the lever and the stop contacts both the lever and the stop while the brake handle is in a park lock position.

18 Claims, 4 Drawing Sheets

(56) References Cited

U.S. PATENT DOCUMENTS 9,327,698 B2 5/2016 Helland
2013/0291356 A1 11/2013 Cannon et al.
2017/0205219 A1* 7/2017 Rusz .................... G01B 5/0028

FOREIGN PATENT DOCUMENTS

| EP | 2011705 | 1/2009 |
| EP | 2388169 | 12/2010 |
| KR | 20130026746 | 3/2013 |
| WO | 2013163458 | 10/2013 |

* cited by examiner

PARK BRAKE SYSTEM ADJUSTMENT TOOL

FIELD

The present disclosure relates generally to the field of brake control system installation and adjustment.

BACKGROUND

Generally, an aircraft dual park/emergency brake valve includes a lever coupled to a handle located in the cockpit of the aircraft via a cable. Proper adjustment of the cable may include moving the handle to a park locked position and using a measuring device, such as a caliper, to measure the distance between a positive stop on the brake valve and the lever of the brake valve. Further, proper adjustment may be achieved by a functional check. With the park/emergency brake system installed and the park brake handle in park lock, the system pressure may be monitored for variation from maximum system pressure. A variation from maximum system pressure may generally indicate that the system is not correctly adjusted. The cable may then be adjusted until a desired distance between the lever and the stop is achieved and/or until maximum system pressure is achieved with the park brake handle in park lock. The functional check may be conducted to determine that the maximum system pressure is achieved.

SUMMARY

Systems and methods disclosed herein may be useful for brake cable adjustment. In this regard, a gage block tool for adjusting a brake cable may comprise a body comprising a first member extending in a first direction, the first member having a first length and a first thickness, and a second member extending in a second direction, the second member having a second length and a second thickness, wherein at least one of the first member or the second member are sized and configured to be placed between a stop and a lever of a brake valve, the brake cable connected between the lever and a brake handle being properly adjusted when the gage block sandwiched between the lever and the stop contacts both the lever and the stop while the brake handle is in a park lock position.

In various embodiments, the first length may be substantially equal to the second length. The first thickness may be substantially equal to the second thickness. The first member may comprise a first inner surface and the second member may comprise a second inner surface, the first inner surface being substantially perpendicular with respect to the second inner surface. The first member may comprise a first outer surface, the first outer surface being oriented at a first angle with respect to the first inner surface. The first angle may comprise a value of between zero and five degrees. The first angle may comprise a value of between zero and three degrees. The first angle may comprise a value of between 1.8 and 2.0 degrees. The second member may comprise a second outer surface, the second outer surface being oriented at a second angle with respect to the second inner surface. The first angle and the second angle may be substantially equal.

A system for brake adjustment may comprise a brake valve having a lever and a stop, a brake cable operatively coupled to the lever and a brake handle, and a gage block having a first surface configured to contact the lever and a second surface configured to contact the stop when the brake handle is in a park lock position.

In various embodiments, the gage block may comprise a first member extending in a first direction, and a second member extending in a second direction. The first direction may be substantially perpendicular to the second direction. At least one of the first member or the second member may be configured to be located between the lever and a positive stop of the brake valve during adjustment of the brake cable. The first surface may be configured to contact the lever of the brake valve in response to the brake handle being moved to a park lock position. The first surface may be configured to be parallel to a surface of the lever in response to the lever contacting the first surface. The first member may comprise the first surface and an inner surface, the first surface being oriented at an angle with respect to the inner surface, the angle comprising a value of between zero and five degrees.

A method for adjusting a brake cable may comprise placing a gage block between a stop and a lever of a brake valve, moving a brake handle connected to the lever by a brake cable to a park lock position, and adjusting the effective length of the brake cable such that the stop and the lever both contact the gage block.

In various embodiments, the adjusting the effective length of the brake cable may be in response to at least one of the lever contacting the gage block before the brake handle has reached the park lock position, or the brake valve lever not being in contact with the gage block in response to the brake handle being moved to the park lock position. The method may further comprise removing the gage block from between the stop and the lever in response to the stop and the lever both contacting the gage block.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the context of the present disclosure, methods may find particular use in connection with aircraft brake systems. However, various aspects of the disclosed embodiments may be adapted for optimized performance with a variety of components and in a variety of systems. As such, numerous applications of the present disclosure may be realized.

Figure 1A:
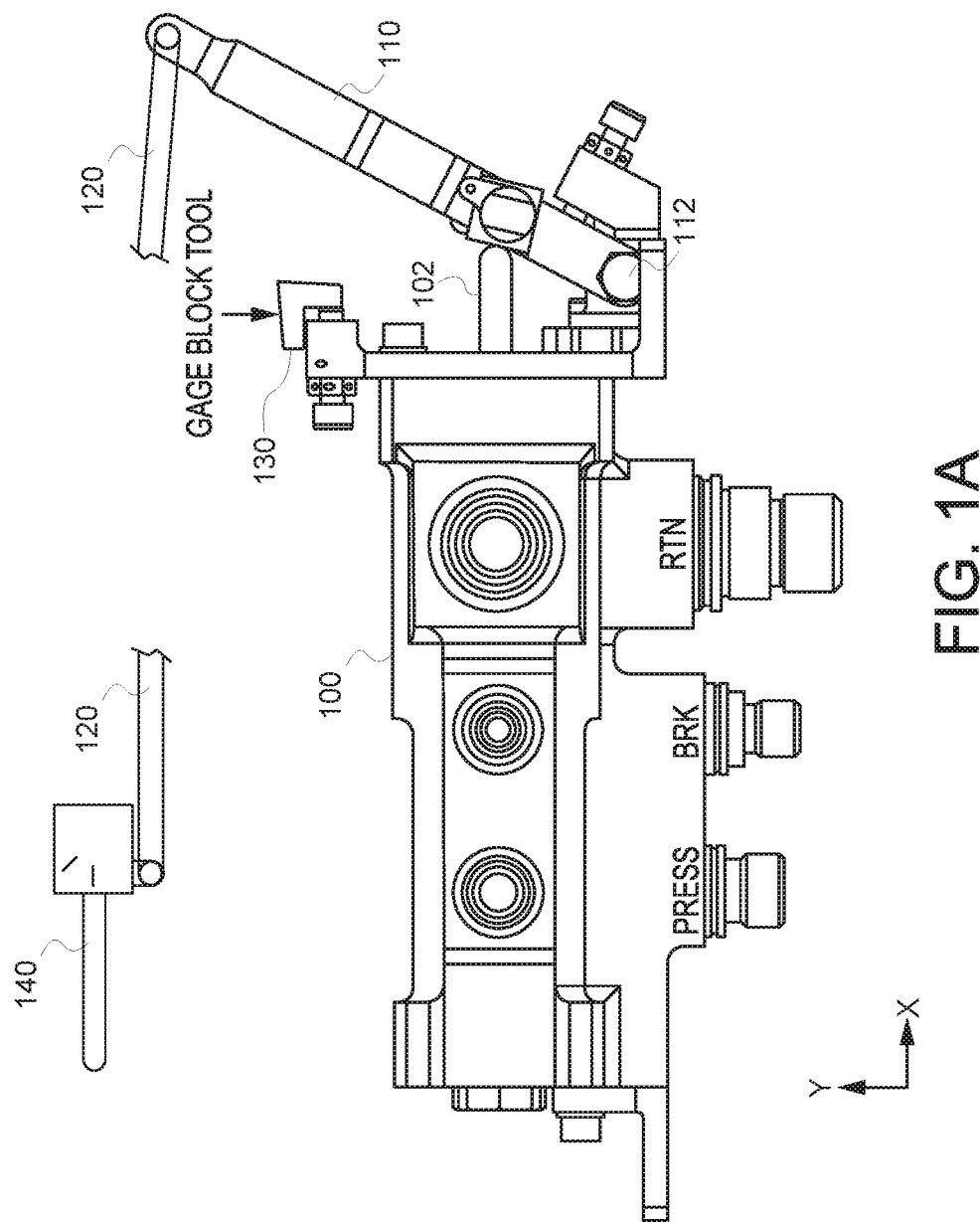
FIG. 1A illustrates a gage block tool located on a park/emergency brake valve with the brake lever and brake valve in a closed, brake off position, and the park brake handle in the stow position, in accordance with various embodiments.
Figure 1B:
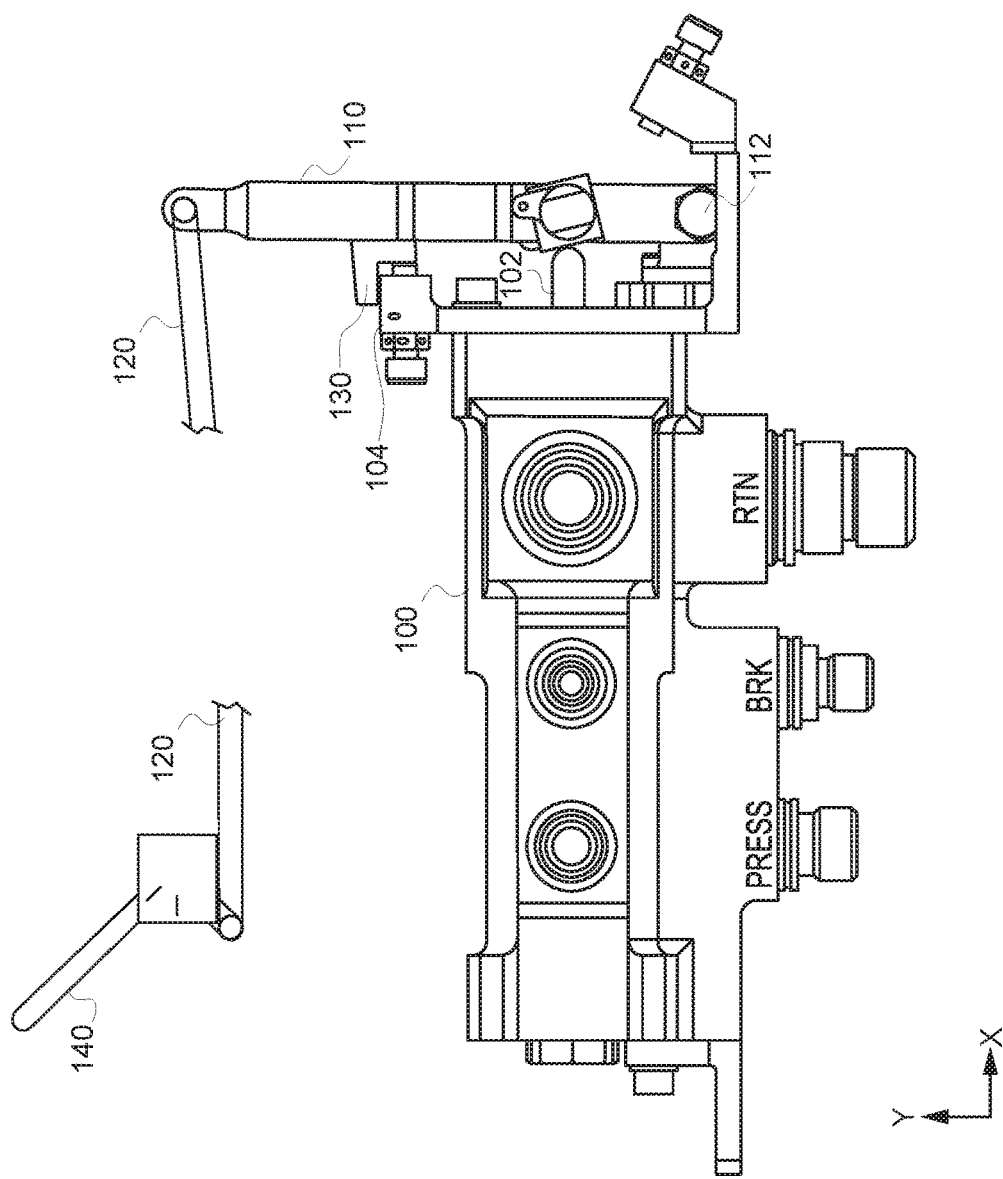
FIG. 1B illustrates a gage block tool located on a park/emergency brake valve with the brake lever and brake valve in an open, brake on position, and the park brake handle in the park lock position in accordance with various embodiments.

With reference to FIG. 1A and FIG. 1B, a gage block tool 130 is illustrated with a brake valve 100 having a lever 110 in the closed, brake off position and the open, brake on position, respectively, in accordance with various embodiments. An xy-axes is provided for ease of illustration. Brake valve 100 may comprise a dual park/emergency brake valve. Brake valve 100 may comprise a valve for controlling hydraulic pressure being applied to a brake. Brake valve 100 may be located near the brakes of a vehicle. Brake valve 100 may comprise a plunger 102. Brake valve 100 may comprise a lever (also referred to herein as a brake lever) 110. Lever 110 may rotate about pivot 112. Plunger 102 may be configured to translate into and/or out brake valve 100. Plunger 102 may translate outwards (positive x-direction) from brake valve 100 in response to lever 110 rotating away from (clockwise direction in FIG. 1A) brake valve 100. Plunger 102 may translate into (negative x-direction) brake valve 100 in response to lever 110 rotating towards (counter-clockwise direction in FIG. 1B) brake valve 100. In this regard, brake valve 100 may be in a closed, brake off position in response to plunger 102 being in an extended position, as illustrated in FIG. 1A. Conversely, brake valve 100 may be in an open, brake on position in response to plunger 102 being in a contracted position, as illustrated in FIG. 1B. Hydraulic pressure being supplied to a brake may increase in response to brake valve 100 moving from a closed position to an open position.

In various embodiments, a cable (also referred to herein as a brake cable) 120 may be coupled to lever 110. Cable 120 may comprise a steel ribbon. Cable 120 may comprise a push/pull cable. In this regard, cable 120 may operate in response to a pushing force and in response to a pulling force. Cable 120 may be coupled to a handle (also referred to herein as brake handle) 140. Handle 140 may be located in the cockpit of an aircraft, for example. Handle 140 may comprise a park/emergency handle. Handle 140 may be operatively coupled to lever 110 via cable 120. In this regard, lever 110 may be configured to be located in the closed, brake off position, as illustrated in FIG. 1A, in response to handle 140 being in the stow position.

Conversely, lever 110 may be configured to be located in the open, brake on position, as illustrated in FIG. 1B, in response to handle 140 being in the park lock position. In various embodiments, the park lock position may correspond to a position of handle 140, wherein in response to handle 140 being in the park lock position, brake valve 100 is in a fully open position.

In various embodiments, brake valve 100 may comprise a stop (also referred to herein as a positive stop) 104. During an installation or adjustment process of cable 120, gage block tool 130 may be placed over stop 104. Handle 140 may be moved to a park lock position, as illustrated in FIG. 1B. Cable 120 may be adjusted in response to lever 110 contacting gage block tool 130 prior to handle 140 reaching the park lock position. For example, cable 120 may be lengthened in response to lever 110 contacting gage block tool 130 prior to handle 140 reaching the park lock position. Cable 120 may be adjusted in response to lever 110 not contacting gage block tool 130 when handle 140 is in the park lock position. For example, cable 120 may be shortened in response to lever 110 not contacting gage block tool 130 when handle 140 is in the park lock position. In this regard, cable 120 may be properly adjusted in response to gage block tool 130 being sandwiched between stop 104 and lever 110 in response to handle 140 being moved to the park lock position.

Figure 2:
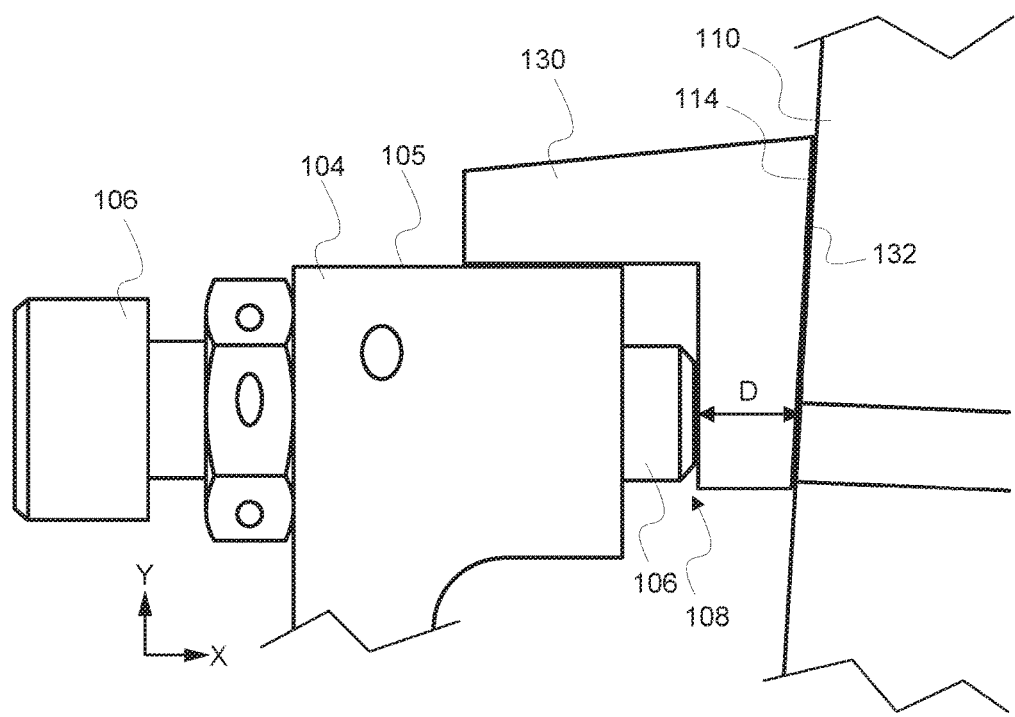
FIG. 2 illustrates a close-up view of the gage block tool located on the park/emergency brake valve of FIG. 1A, in accordance with various embodiments.

With reference to FIG. 2, a close-up view of gage block tool 130 of FIG. 1B is illustrated. As previously mentioned, lever 110 may contact gage block tool 130 in response to handle 140 (see FIG. 1B) being in the park lock position and cable 120 (see FIG. 1B) being properly adjusted. In other words, cable 120 may be properly adjusted in response to surface 114 of lever 110 contacting, and being substantially parallel to, outer surface 132 of gage block tool 130 when handle 140 (see FIG. 1B) is in the park lock position. In this regard, surface 114 of lever 110 may contact outer surface 132 of gage block tool 130. Outer surface 132 may be substantially (within 0.5 degrees) parallel to surface 114 in response to outer surface 132 contacting surface 114.

In various embodiments, stop 104 may comprise a member 106. In various embodiments, member 106 may comprise an adjustable member. Member 106 may comprise a bolt. Gage block tool 130 may contact end 108 of member 106. Gage block tool 130 may extend over (in the negative y-direction) end 108. Gage block tool 130 may contact top surface 105 of stop 104.

Figure 3:
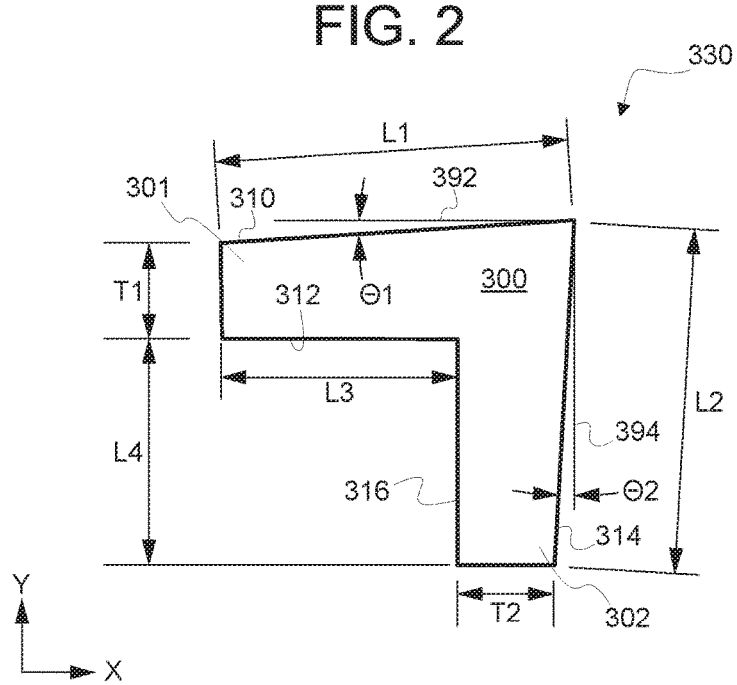
FIG. 3 illustrates a gage block tool, in accordance with various embodiments.

With reference to FIG. 3, a cross-section view of gage block tool 330 is illustrated. Gage block tool 330 may comprise a solid body 300 having a first member 301 extending in a first direction (negative x-direction) and a second member 302 extending in a second direction (negative y-direction). First member 301 may comprise a first outer surface 310 and a first inner surface 312. First outer surface 310 may comprise a length L1. First inner surface 312 may comprise a length L3. Second member 302 may comprise a second outer surface 314 and a second inner surface 316. Second outer surface 314 may comprise a length L2. Second inner surface 316 may comprise a length L4. In various embodiments, length L1 may be substantially equal to length L2. In various embodiments, length L3 may be substantially equal to length L4. First inner surface 312 may be oriented substantially (within 0.5 degrees) perpendicular to second inner surface 316. First member 301 may comprise a thickness T1. Second member may comprise a thickness T2. Thickness T1 may be measured at an end of first member 301 as illustrated in FIG. 3. Thickness T2 may be measured at an end of second member 302 as illustrated in FIG. 3. In various embodiments, thickness T1 may comprise a minimum thickness of first member 301. In various embodiments, thickness T2 may comprise a minimum thickness of second member 302. In various embodiments, thickness T1 may be substantially equal to thickness T2, wherein the term substantially in this regard may mean that thickness T1 may be within 99% to 101% of the thickness of T2. In this regard, either first member 301 or second member 302 may be configured to be located between stop 104 (see FIG. 2) and lever 110 (see FIG. 2). In this regard, gage block tool 330 may comprise a symmetrical geometry such that either first member 301 or second member 302 may be placed between stop 104 (see FIG. 2) and lever 110 (see FIG. 2). Similarly, gage block tool 330 may be sized to be placed between stop 104 (see FIG. 2) and lever 110 (see FIG. 2).

For clarity purposes, imaginary line 392 has been provided. Imaginary line 392 is parallel to first inner surface 312. In various embodiments, first outer surface 310 may be oriented at a first angle Θ1 with respect to imaginary line 392. In this regard, first outer surface 310 may be oriented at a first angle Θ1 with respect to first inner surface 312, in accordance with various embodiments. For clarity purposes, imaginary line 394 has been provided. Imaginary line 394 is parallel to second inner surface 316. In various embodiments, second outer surface 314 may be oriented at a second angle Θ2 with respect to imaginary line 394. In this regard, second outer surface 314 may be oriented at a second angle Θ2 with respect to second inner surface 316, in accordance with various embodiments. In various embodiments, first angle Θ1 may comprise a value of between zero and five degrees (0°-5°). In various embodiments, first angle Θ1 may comprise a value of between zero and three degrees (0°-3°). In various embodiments, first angle Θ1 may comprise a value of between one point eight and two point zero degrees (1.8°-2.0°). In various embodiments, second angle Θ2 may comprise a value of between zero and five degrees (0°-5°). In various embodiments, second angle Θ2 may comprise a value of between zero and three degrees (0°-3°). In various embodiments, second angle Θ2 may comprise a value of between one point eight and two point zero degrees (1.8°-2.0°). In various embodiments, second angle Θ2 may be substantially (within 0.2 degrees) equal to first angle Θ1.

In various embodiments, with combined reference to FIG. 2 and FIG. 3, second outer surface 314 may be configured to contact surface 114 of lever 110 and second inner surface 316 may be configured to contact end 108 of stop 104. In this regard, thickness T2 may correspond to a desired distance between stop 104 and lever 110 in response to cable 120 (see FIG. 1B) being properly adjusted. Stated another way, thickness T1 may correspond to a desired distance D between the stop 104 and the lever 110, in response to cable 120 (see FIG. 1B) being properly adjusted. Adjusting cable 120 (see FIG. 1B) such that lever 110 is spaced by desired distance D from stop 104 may ensure that full pressure is supplied to a brake in response to handle 140 being moved to the park lock position. Gage block tool 330 may comprise various steel alloys.

Figure 4:
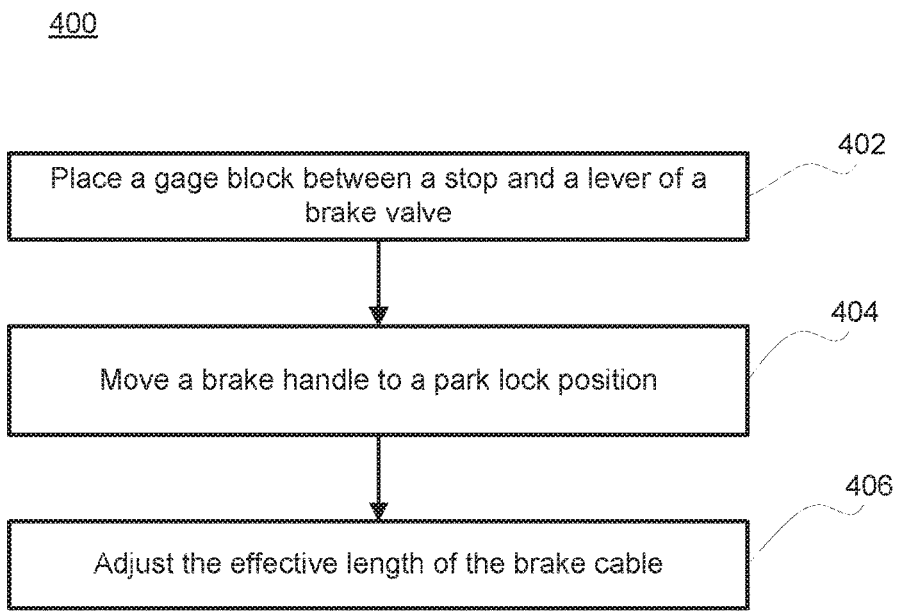
FIG. 4 provides a method for adjusting a brake cable, in accordance with various embodiments.

With reference to FIG. 4, a method 400 for adjusting a brake cable is illustrated, in accordance with various embodiments. Method 400 may include placing a gage block between a brake valve stop and a brake valve lever (step 402). Method 400 may include moving a brake handle to a park lock position (step 404). Method 400 may include adjusting an effective length of the brake cable (step 406).

In various embodiments, with combined reference to FIG. 1B and FIG. 4, step 402 may include placing gage block tool 130 between stop 104 and lever 110. Step 404 may include moving handle 140 to the park lock position (as illustrated in FIG. 1B). Step 406 may include adjusting the effective length of cable 120 such that the stop 104 and the lever 110 are both in contact with the gage block tool 130. As previously discussed, cable 120 may be adjusted in response to lever 110 contacted gage block tool 130 prior to handle 140 reaching the park lock position. Cable 120 may be adjusted in response to lever 110 not contacting gage block tool 130 when handle 140 is in the park lock position. Gage block tool 130 may be removed from between the stop 104 and the lever 110 in response to the stop 104 and the lever 110 both contacting the gage block tool 130. Stated another way, the gage block tool 130 may be removed from between the stop 104 and the lever 110 after the adjustment process is complete.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A gage block tool for adjusting a brake cable comprising:
   a body comprising:
     a first member extending in a first direction, the first member having a first length and a first thickness; and
     a second member extending in a second direction, the second member having a second length and a second thickness,
     wherein at least one of the first member or the second member are sized and configured to be placed between a stop and a lever of a brake valve, the brake cable connected between the lever and a brake handle being properly adjusted when the gage block sandwiched between the lever and the stop contacts both the lever and the stop while the brake handle is in a park lock position.

2. The gage block tool of claim 1, wherein the first member comprises a first inner surface and the second member comprises a second inner surface, the first inner surface being substantially perpendicular with respect to the second inner surface.

3. The gage block tool of claim 2, wherein the first member comprises a first outer surface, the first outer surface being oriented at a first angle with respect to the first inner surface.

4. The gage block tool of claim 3, wherein the second member comprises a second outer surface, the second outer surface being oriented at a second angle with respect to the second inner surface.

5. The gage block tool of claim 4, wherein the first angle and the second angle are substantially equal.

6. The gage block tool of claim 3, wherein the first angle comprises a value of between zero and five degrees.

7. The gage block tool of claim 3, wherein the first angle comprises a value of between zero and three degrees.

8. The gage block tool of claim 3, wherein the first angle comprises a value of between 1.8 and 2.0 degrees.

9. The gage block tool of claim 1, wherein the first length is substantially equal to the second length.

10. The gage block tool of claim 1, wherein the first thickness is substantially equal to the second thickness.

11. A system for brake adjustment comprising:
   a brake valve having a lever and a stop;
   a brake cable operatively coupled to the lever;
   a brake handle; and
   a gage block tool for adjusting the brake cable, comprising:
     a first member extending in a first direction, the first member having a first length and a first thickness; and
     a second member extending in a second direction, the second member having a second length and a second thickness,
     wherein at least one of the first member or the second member are sized and configured to be placed between the stop and the lever of the brake valve, the brake cable connected between the lever, and the brake handle being properly adjusted in response to the gage block tool, sandwiched between the lever and the stop, contacting both the lever and the stop while the brake handle is in a park lock position.

12. The system of claim 11, wherein the first direction is substantially perpendicular to the second direction.

13. The system of claim 11, wherein at least one of the first member or the second member are configured to be located between the lever and a positive stop of the brake valve during adjustment of the brake cable.

14. The system of claim 11, wherein the first surface is configured to contact the lever of the brake valve in response to the brake handle being moved to the park lock position.

15. The system of claim 11, wherein the first surface is configured to be parallel to a surface of the lever in response to the lever contacting the first surface.

16. The system of claim 11, wherein the first member comprises the first surface and an inner surface, the first surface being oriented at an angle with respect to the inner surface, the angle comprising a value of between zero and five degrees.

17. A method for adjusting a brake cable comprising:
   placing a gage block between a stop and a lever of a brake valve;
   moving a brake handle connected to the lever by a brake cable to a park lock position; and
   adjusting the effective length of the brake cable such that the stop and the lever both contact the gage block,
   wherein the adjusting the effective length of the brake cable is in response to at least one of:
     the lever contacting the gage block before the brake handle has reached the park lock position, or
     the brake valve lever not being in contact with the gage block in response to the brake handle being moved to the park lock position.

18. The method of claim 17, further comprising removing the gage block from between the stop and the lever in response to the stop and the lever both contacting the gage block.

* * * * *